March 19, 1940.   M. KLAVÍK   2,194,395

SPRING SUSPENSION OF AUTOMOBILES

Filed Dec. 20, 1938

Inventor
Milos Klavík
By Bihinger. Atty.

Patented Mar. 19, 1940

2,194,395

UNITED STATES PATENT OFFICE 2,194,395

SPRING SUSPENSION OF AUTOMOBILES

Miloš Klavík, Prague, Czechoslovakia

Application December 20, 1938, Serial No. 246,922
In Czechoslovakia November 20, 1937

2 Claims. (Cl. 180—73)

This invention relates to the spring suspension of driving half-axles particularly in the case of automobiles having rear-wheel drives.

In the case of automobiles in which the driving unit consisting of the motor, the change-speed gear and the driving half-axles, is arranged at the rear of the vehicle and is connected with the automobile body by a transverse carrier embracing the oscillatable half-axles, the usual arrangement of the transverse leaf spring over the half-axles is not suitable, since this spring is only accessible with difficulty when being examined.

According to the invention, there is arranged for each half-axle a separate spring external to the transverse axle carrier in such manner that it contacts by one end the outer end of the axles or their brake drums whilst the other end is carried on the motor or change-speed gear housing, the spring being fitted obliquely in such manner that its centre point is carried on one side of the transverse axle carrier.

Figure 1:
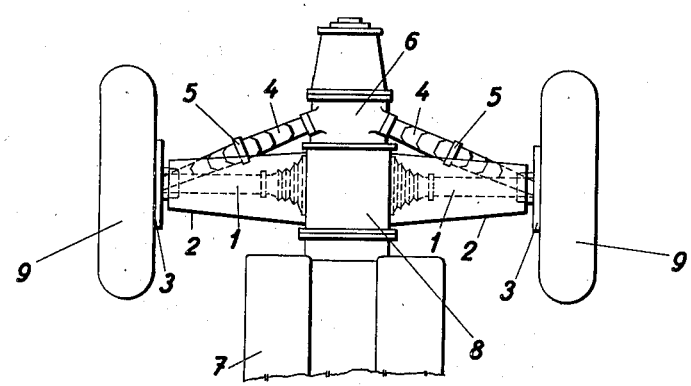
Figure 2:
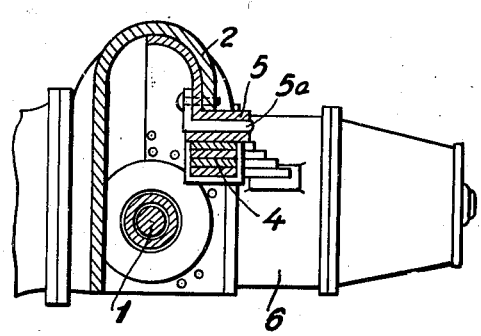

A construction of the invention is shown diagrammatically, by way of example, in the annexed drawing in which Fig. 1 is a top plan view and Fig. 2 is an enlarged section on the line II—II of Fig. 1.

The oscillatable half-axle 1 is in part surrounded by the transverse axle carrier 2 and there is provided on the backing plate of the brake drum 3 of this half-axle a bearing for the outer end of the obliquely carried leaf spring 4. At its centre point where this spring passes the wall of the carrier 2, the spring is hinged on to this wall. The hinging of the springs to the wall 2 (which is rigid with the vehicle frame) may be accomplished in any desired way, as for example, by providing the springs with sockets 5a and the carrier 2 with pins 5 as shown in Fig. 2. The inner end of the spring is carried on the housing 6 of the motor or the change-speed gear of the driving aggregate, according to whether the spring is located in or opposite to the direction of travel.

The advantage of this arrangement consists apart from the accessibility already mentioned, in that by the bearing of the spring on the support, the driving unit itself is substantially relieved from the stress occurring through the work of the spring in the spring suspension.

I claim:

1. In a rear-engined automobile, driving half axles, transverse carriers enclosing the driving half axles, springs at an angle with the half axles and anchored at one of their ends to the half axles, a driving unit, the other ends of the springs being anchored to the driving unit, and connections at the centre of the springs whereby they are connected to the transverse carriers.

2. In a rear-engined automobile, driving half axles, transverse carriers enclosing the driving half axles, springs at an angle with the half axles, brake drum backing plates on the half axles, the springs being anchored at one of their ends to the brake drums, a driving unit, the other ends of the springs being anchored to the driving unit, and connections at the centre of the springs whereby they are connected to the transverse carriers.

MILOŠ KLAVÍK.